(12) United States Patent
Rolia et al.

(10) Patent No.: US 8,055,493 B2
(45) Date of Patent: Nov. 8, 2011

(54) SIZING AN INFRASTRUCTURE CONFIGURATION OPTIMIZED FOR A WORKLOAD MIX USING A PREDICTIVE MODEL

(75) Inventors: Jerome Rolia, Kanata (CA); Sebastian Gaisbauer, Rörnbach (DE); Sebastian Phillipp Schneider, Schopfheim (DE); Nigel Edwards, Bristol (GB); Johannes Kirschnick, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 12/363,597

(22) Filed: Jan. 30, 2009

(65) Prior Publication Data

US 2010/0199267 A1 Aug. 5, 2010

(51) Int. Cl.
 *G06F 17/50* (2006.01)
(52) U.S. Cl. .......................................................... 703/13
(58) Field of Classification Search ...................... 703/13
See application file for complete search history.

(56) References Cited

U.S. PATENT DOCUMENTS

| | | | |
|---|---|---|---|
| 2006/0184414 A1 | 8/2006 | Pappas et al. | |
| 2007/0112615 A1 | 5/2007 | Maga et al. | |
| 2008/0263400 A1* | 10/2008 | Waters et al. | 714/30 |

FOREIGN PATENT DOCUMENTS

WO   WO 2007065195   6/2007

OTHER PUBLICATIONS

Krishnamurthy: Synthetic workload generation for stress testing session-based systems (Doctoral thesis: Rolia—thesis advisor); Carleton University Ottawa, Ont., Canada 2004; ISBN:0-612-94203-1; pp. 1-171.*

Parpatakam; Performance Testing Why and How?; HP talk; 2007; pp. 1-37.*

Vail; Stress, Load, Volume, Performance, Benchmark and Base Line Testing Tool Evaluation and Comparison; handout at educational seminar; 2005; pp. 1-213 (especially pp. 67-73—discusses Loadrunner).*

Krishnamurthy et al.; A Synthetic Workload Generation Technique for Stress Testing Session-Based Systems; IEEE Transactions on Software Engineering, vol. 32, No. 11, pp. 868-882; Nov. 2006.*

Sebastian Gaisbauer et al., "VATS: Virtualized-Aware Automated Test Service", Quantitative Evaluation of Systems, 2008. QEST '08. Fifth Int'l Conference, Sep. 14-17, 2008 pp. 1-10.

Jerry Rolia et al., "Adaptive Information Technology for Service Lifecycle Management", HP Laboratories, HPL-2008-80, Jul. 21, 2008, pp. 1-24.

Xueling Shu et al., "A Tool for Automated Performance Testing of Java3D Applications in Agile Environments", Int'l Conference on Software Eng'g Advances(ICSEA 2007), pp. 1-6.

(Continued)

*Primary Examiner* — Hugh Jones

(57) ABSTRACT

Sizing an infrastructure configuration optimized for a workload mix includes: receiving the workload mix; identifying demand estimates for the one or more predefined benchmarks; applying a predictive model to identify an initial infrastructure configuration having a size anticipated to meet the demand estimates; instructing a virtualized-aware testing service (VATS) test controller to perform a test of the initial infrastructure configuration in a virtualized environment, where performance of the test generates at least one test result; determining whether the at least one test result satisfies a predetermined requirement as identified in the workload mix; and outputting the determination of whether the at least one test result satisfies the predetermined requirement.

15 Claims, 5 Drawing Sheets

OTHER PUBLICATIONS

Diwakar Krishnamurthy et al., "A Synthetic Workload Generation Technique for Stress Testing Session-Based Sys.", IEEE Transactions on Software Eng'g, vol. 32, No. 11, Nov. 2006, pp. 868-882.

Catalin Dumitrescu et al., "DiPerF: an automated Distributed PERformance testing Framework", in Proc. 5st IEEE/ACM Internal Workshop on Grid Computing, 2004, pp. 1-8.

* cited by examiner

SIZING AN INFRASTRUCTURE CONFIGURATION OPTIMIZED FOR A WORKLOAD MIX USING A PREDICTIVE MODEL

CROSS-REFERENCE TO RELATED APPLICATIONS

The present application has the same Assignee and shares some common subject matter with U.S. patent application Ser. No. 12/363,558, filed on even date herewith, by Johannes Kirschnick et al., U.S. patent application Ser. No. 12,636,581, filed on even date herewith, by Jerome Rolia et al., and U.S. patent application Ser. No. 12/252,395, filed on Oct. 16, 2008, by Jerome Rolia et al., which claims the benefit of priority to U.S. Provisional Patent Application No. 61/001,483, filed on Oct. 31, 2007. The disclosures of the above-identified applications for patent are hereby incorporated by reference in their entireties.

BACKGROUND

There has been substantial growth in the purchase of information technology as a service from internal and external service providers and this trend appears to be increasing rapidly. This growth is enabled by the trend towards cloud computing, in which, services run on shared virtualized resource pools that are accessible via Intranets or the Internet. As this cloud computing paradigm matures, there is also an increasing trend for businesses to exploit the paradigm to support business critical services such as sales and delivery, and supply chain management. Those services will have performance requirements and are likely to place significant loads on cloud infrastructures.

With the increasing loads currently being placed on cloud computing infrastructures, it is becoming increasingly important to create systems configured to accurately model the workloads imposed upon the systems contained in the cloud computing infrastructures. One modeling method utilizes benchmarks to impose a synthetic workload on the cloud computing infrastructures being tested. The use of benchmarks facilitates the management of the enterprise application system in areas such as capacity planning and service level performance.

A typical business process, for instance, ordering, may in turn invoke a number of discreet business objects in order to complete the business process. In addition, a given business object may be characterized by a particular sequence of interdependent requests which are exchanged between entities in the enterprise application system. In other words, the sequence of interdependent requests should be performed correctly in order to correctly implement the business process. Thus, a benchmark for modeling the enterprise application system should accurately reflect the correct sequence and volume of interdependent requests. Otherwise, an incorrect sequence of interdependent requests may cause an error condition that does not accurately model the demands placed upon the enterprise application system.

However, conventional stress testing of enterprise application systems is based upon a small number of pre-existing benchmarks which typically utilize a small subset of business objects. As a result, it is difficult to generate a synthetic workload that accurately models the actual request patterns expected at the enterprise application system. Alternatively, creating a customized benchmark that is representative of a given enterprise is typically too time consuming and expensive for many users.

In addition, conventional stress testing procedures generally require users to have a high level of skill to be able to understand how to size and tune the enterprise application systems to accurately model the actual request patterns. Moreover, manually studying the test results and selecting which change to make to an enterprise application system, to enact that change, and to generate new measurement results and repeating that process until a suitable configuration is determined, is typically too time consuming and complicated for users to perform. In addition to the time required to perform these tests, the tests are likely to also require a large amount of power and other resources, such as, bandwidth and network utilization.

It would thus be beneficial to be able to automatically size a system without suffering from all of the drawbacks and disadvantages of conventional sizing methods.

BRIEF DESCRIPTION OF DRAWINGS

The embodiments of the invention will be described in detail in the following description with reference to the following figures.

DETAILED DESCRIPTION OF EMBODIMENTS

Figure 1A:
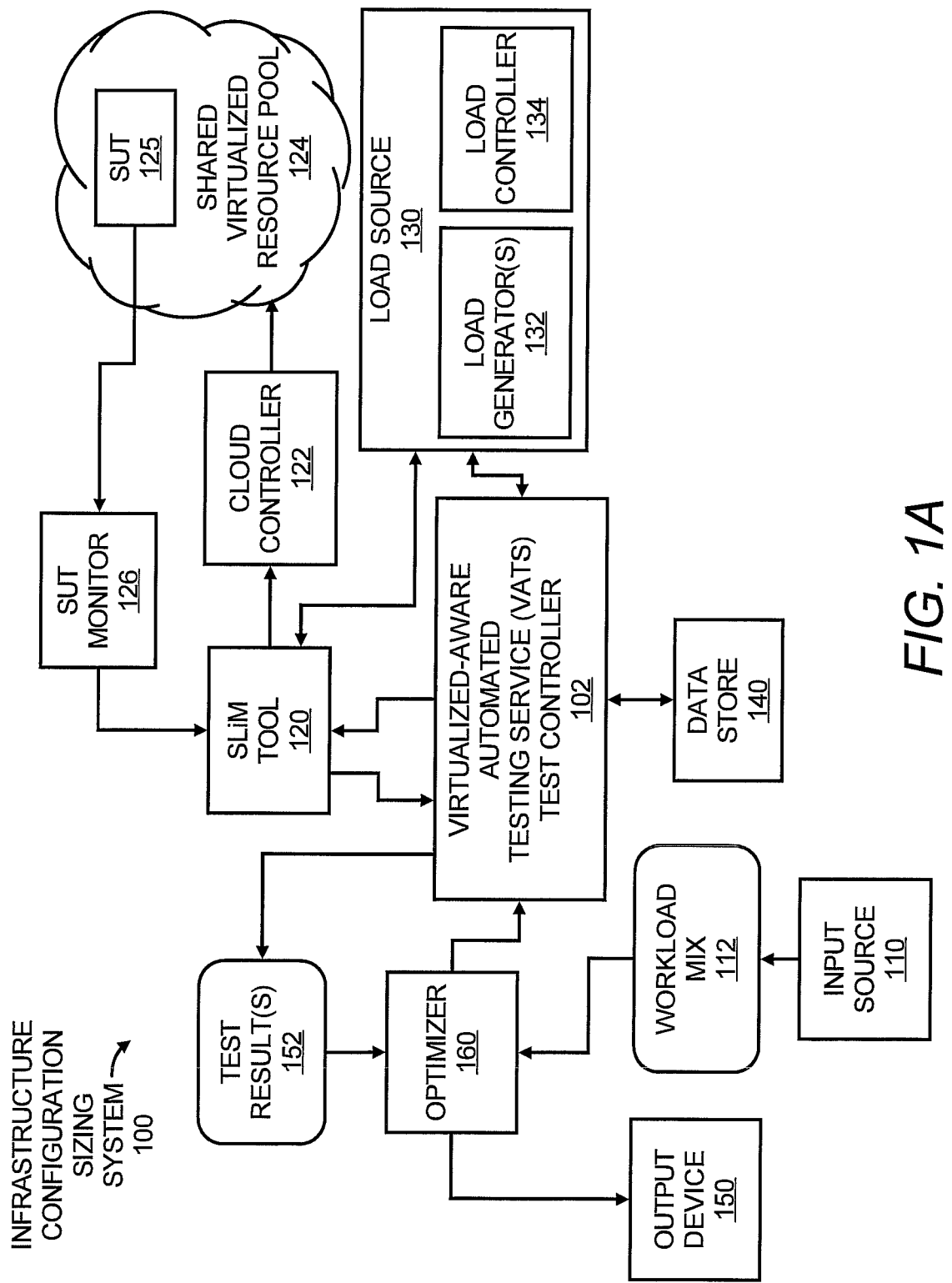
FIG. 1A illustrates a block diagram of an infrastructure configuration sizing system, according to an embodiment of the invention.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Disclosed herein is an optimizer for sizing an infrastructure configuration optimized for a workload mix and a method for implementing the optimizer. The optimizer is configured to receive the workload mix of a particular customer, which includes benchmarks that are relevant to the particular customer's requirements, which is described in the Ser. No. 12/252,395 application for patent. The optimizer is also configured to operate with a virtualized-aware testing service (VATS) test controller to identify demand information associated with various infrastructure configurations. Various manners in which the VATS test controller operates to identify the demand information are described in the Ser. No. 12/363, 558 application for patent.

The optimizer is configured to create a predictive model that models the correlations between the various infrastructure configurations and the identified demand information. In addition, the optimizer is configured to apply the predictive model on a plurality of parameters in an initial infrastructure configuration to identify at least one parameter to modify, in which the modification of the at least one parameter is anticipated to result in the at least one test result satisfying the predetermined requirement. In other words, the optimizer is configured to apply the predictive model to identify an infrastructure configuration that is able to perform the workload while satisfying one or more predetermined requirements as defined in the workload mix.

The optimizer and method disclosed herein are highly customizable to customers' particular needs because the optimizer and method disclosed herein are able to identify optimized infrastructure configurations for the workload mixes of each particular customer's needs. In one regard, therefore, the optimizer and method disclosed herein enable identification of the infrastructure configuration that enables the infrastructure configuration to remain below a predetermined resource utilization requirement while performing the workloads defined in the workload mixes. Thus, by way of particular example, the predetermined threshold resource utilization requirement may be set to be a minimum resource usage requirement and the optimizer and method disclosed herein may identify the infrastructure configuration that requires the least amount of cost to perform the individual workload requirements of the customers.

Through implementation of the predictive models as disclosed herein, which enable the impact of various changes on infrastructure configurations to be anticipated, the amount of time required to accurately size an infrastructure configuration such that the infrastructure configuration is optimized for a particular workload mix may substantially be reduced as compared with conventional sizing techniques.

With reference first to FIG. 1A, there is shown a block diagram of an infrastructure configuration sizing system 100, according to an example. In one regard, the methods disclosed herein below may be implemented in the system 100 as discussed in greater detail herein below. It should be understood that the system 100 may include additional elements and that some of the elements described herein may be removed and/or modified without departing from a scope of the system 100.

The infrastructure configuration sizing system 100 is depicted as including a virtualized-aware automated testing service (VATS) test controller 102, an input source 110, a service lifecycle (SLiM) tool 120, cloud controller 122, a service under test (SUT) monitor 126, a load source 130, a data store 140, an output device 150, and an optimizer 160. Also shown in FIG. 1A is a shared virtualized resource pool 124, which comprises a cloud computing environment where services run on shared virtualized resource pools that are accessible via Intranets or the Internet. The use of the cloud computing environment makes it possible for the VATS test controller 102 to rapidly change resource levels and infrastructure configurations and topologies and thus rapidly vary the parameters of the infrastructure configurations to be tested.

Many of the components depicted in the infrastructure configuration sizing system 100 are described in the Ser. No. 12/363,558 application for patent. The disclosure contained in that application for patent thus provides a more detailed discussion with respect to at least some of the components depicted in the infrastructure configuration sizing system 100 and the various manners in which the components interact with each other.

Each of the VATS test controller 102 and the optimizer 160 comprises a hardware device, such as, a circuit or multiple circuits arranged on a board, or, alternatively, each of the VATS test controller 102 and the optimizer 160 comprises software comprising code stored, for instance, in a volatile or non-volatile memory, such as DRAM, EEPROM, MRAM, flash memory, floppy disk, a CD-ROM, a DVD-ROM, or other optical or magnetic media, and the like. In the second example, each of the VATS test controller 102 and the optimizer 160 comprises a software module stored in a memory. In a further alternative, each of the VATS test controller 102 and the optimizer 160 comprises a combination of hardware and software modules. In addition, although the VATS test controller 102 and the optimizer 160 have been depicted as forming separate components, the VATS test controller 102 and the optimizer 160 may be formed as a single unit, such that the resulting configuration has the same functional characteristics, as discussed in greater detail herein below.

In any regard, the VATS test controller 102 and the optimizer 160 are generally configured to perform a number of functions in the system 100. As discussed in greater detail herein below, the VATS test controller 102 comprises code or is otherwise configured to automatically execute tests, manipulate a virtualized infrastructure (for instance, a cloud computing environment) to perform the tests under multiple configurations and collect performance information of resources in executing the tests under the multiple configurations.

The optimizer 160 comprises code or is otherwise configured to interact with the VATS test controller 102 to cause the VATS test controller 102 to perform the tests, and to collect test results 152 from the VATS test controller 102. In addition, the optimizer 160 comprises code or is otherwise configured to analyze the test results 152 and to create a predictive model from the collected information. The information collected from the VATS test controller 102 includes structural information, which includes, for instance, information pertaining to the structures of the infrastructure configurations being tested. The collected information also includes resource demand information, which includes, information pertaining to the resources required by each of the tested infrastructure configurations. By way of example, the optimizer 160 may identify various correlations between various infrastructure configurations and resource demands resulting from those various infrastructure configurations and may create the predictive model from those various correlations. In addition, the model application module 170 (FIG. 1B) may update the predictive model to include additional correlations as the VATS test controller 102 performs additional tests on various other infrastructure configurations.

According to an example, the optimizer 160 creates the predictive model through use of queuing models, which are often called "constructive models" because in these types of models, the infrastructure configuration is specified, the demand information is inputted, and a model predicts an outcome. According to another example, the optimizer 160 creates the predictive model through use of machine learning models. According to a further example, the optimizer 168 creates the predictive model through use of a simulation model.

In any event, the optimizer 160 is configured to create the predictive model to include a relatively large amount of information pertaining to the different infrastructure configurations being tested. In one regard, the information includes system descriptions from the SLiM tool 120 pertaining to the different infrastructure configurations, such as, identities of the virtual machines employed in the different infrastructure configurations, service rates for the resources (e.g., the CPU speeds, etc.) in the virtual machines, memory sizes, types of application servers that are run on the virtual machines, bandwidths allocated to the different infrastructure configurations, etc.

The optimizer 160 is also configured to apply the predictive model on a plurality of parameters of an infrastructure configuration to identify at least one parameter to modify that is anticipated to result in an optimal sizing of the infrastructure configuration for a workload mix 112. The workload mix 112 may be defined as a description of how a client is expected to use different system functions in an infrastructure configured to perform a desired workload as well as the client's expectations in performing the workload. The optimizer 160 further comprises code or is otherwise configured to modify the identified at least one parameter and, in certain embodiments, to cause the VATS test controller 102 to perform additional tests to validate or invalidate the effect of the at least one parameter identified through application of the predictive model.

By way of particular example, the optimizer 160 identifies parameters of an initial infrastructure configuration to be tested by the VATS test controller 102, which is based upon the ratio of one or more predefined benchmarks. In addition, in the event that the initial infrastructure configuration fails to satisfy a predetermined requirement identified in the workload mix 112, the optimizer 160 applies a predictive model on the parameters to identify at least one parameter to modify that is anticipated to result in the identification of an infrastructure configuration that satisfies the predetermined requirement identified in the workload mix 112. In some embodiments, the optimizer 160 interacts with the VATS test controller 102 to perform additional tests on one or more modified infrastructure configurations to determine whether the infrastructure configuration identified through application of the predictive model results in a final infrastructure configuration that is optimally sized, for instance, in terms of minimized resource utilization, for the workload mix 112.

The predetermined requirement identified in the workload mix 112 may comprise user-defined requirements, such as, a response time goal at a required throughput level, while performing the workload, a requirement that the amount of resources utilized in performing the workload remain within a predetermined resource utilization requirement or that the utilized amount of resources be minimized while still meeting the other predetermined requirements of, for instance, response time and throughput goals, etc.

Figure 1B:
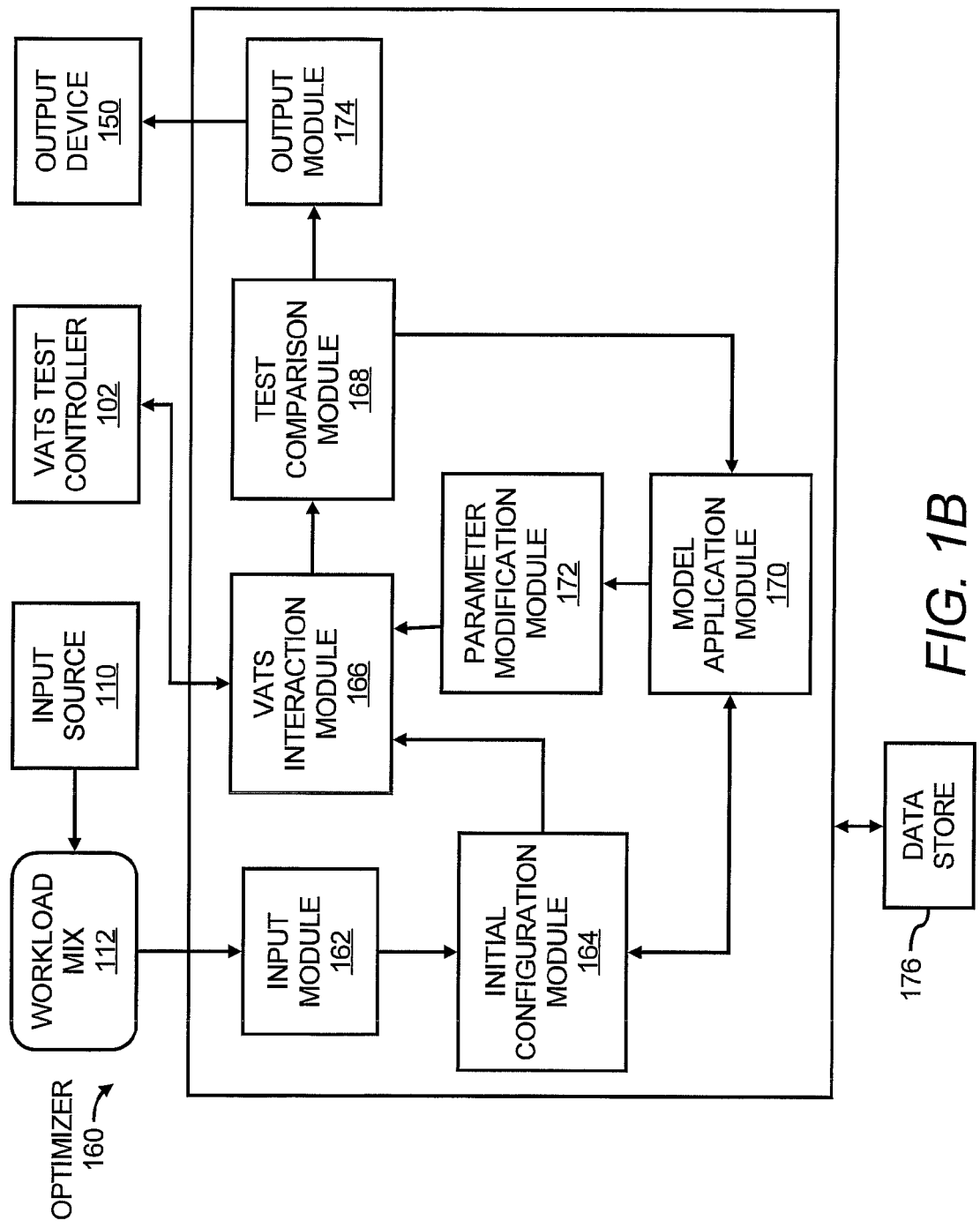
FIG. 1B illustrates a more detailed block diagram of the optimizer depicted in FIG. 1A, according to an embodiment of the invention.

A more detailed block diagram illustration of the optimizer 160 is depicted in FIG. 1B, which shows the optimizer 160 as including an input module 162, an initial configuration module 164, a VATS interaction module 166, a test comparison module 168, a model application module 170, a parameter modification module 172, and an output module 174. The modules 162-174 may comprise software modules, hardware modules, or a combination thereof, as discussed above with respect to the optimizer 160. The optimizer 160 is also depicted as being in communication with a data store 176.

As shown in FIG. 1B, the input module 162 receives input from an input source 110. According to an example, the input source 110 comprises a computer program stored on a computer readable storage medium configured to define a workload mix 112 and to input the defined workload mix 112 into the optimizer 160. The workload mix 112 may generally be defined as being based upon a ratio of one or more predefined benchmarks, which correspond to a desired workload to be performed by resources in an infrastructure, and as including one or more predetermined requirements in performing the desired workload. The predetermined requirements include, for instance, desired throughput and response time requirements, which may be client-defined. Thus, by way of particular example, the workload mix 112 may indicate that certain functions, such as, various business objects are to be implemented, as well as the sequence in which the certain functions are to be performed. In addition, the VATS test controller 102 is configured to identify an initial infrastructure configuration configured to perform those functions in the correct sequence.

The ratio of the one or more predefined benchmarks is described in greater detail in the Ser. No. 12/252,395 application for patent. As discussed in that application for patent, the predefined benchmark(s) are benchmark(s) configured to accurately reflect the sequences and dependencies of interdependent requests that are required to be performed correctly in order to correctly implement a client's business process. Generally speaking, therefore, the predefined benchmark(s) define workloads, including the order in which the workloads are to be performed, that are substantially similar to the workloads that a client is likely to require from the resources in an infrastructure.

The optimizer 160 may store the workload mix 112, which includes the predefined benchmark(s) and the predetermined requirement(s), in the data store 176. The data store 176 comprises any device capable of storage of information or any combination of devices capable of storage of information, such as, a semiconductor device, a magnetic disk memory device, nonvolatile memory devices, such as, an EEPROM or CDROM, etc. The data store 176 may also comprise a fixed or removable data storage device.

The initial configuration module 164 is configured to receive the workload mix information from the input module 162. In addition, the initial configuration module 164 is configured to operate with the model application module 170 to identify a plurality of initial infrastructure configuration parameters to be tested by the VATS test controller 102 based upon the predefined benchmark(s) defined in the workload mix information. For instance, the initial configuration module 164 identifies demand estimates for the predefined benchmark(s) and communicates the demand estimates to the model application module 170. The model application module 170 is configured to apply a predictive model on the demand estimates to identify an initial infrastructure configuration that may include a particular combination of parameters or resources that is anticipated to meet the demand estimates, such as a particular number or kind of application servers, particular memory sizes of the application servers, concurrency parameters that govern each application's concurrency management mechanisms (e.g., threads), a particular number of network switches, a particular allocation of network bandwidth, etc.

Generally speaking, the predictive model contains information that may be used to predict the likely impact that various parameters of the infrastructure configuration are likely to have on the performance of the infrastructure configuration. As discussed above, the predictive model contains two types of information; one is structural information and the other is resource demand information. The structural information is captured from the description of the infrastructure configuration, which is identified by the VATS test controller 102 in operation with the other components of a virtualized-aware testing service as discussed in the Ser. No. 12/363,558 application for patent. The resource demand information, for instance, test results, is determined from tests that the VATS test controller 102 performs on various infrastructure configurations.

Moreover, the initial configuration module 164 is configured to communicate the initial infrastructure configuration parameters to the VATS test controller 102 through the VATS interaction module 166 and to instruct the VATS test controller 102 to perform a test on the initial infrastructure configuration parameters. In this regard, the VATS interaction module 166 may comprise a hardware and/or software interface that enables communications between the optimizer 160 and the VATS test controller 102.

In response to receipt of the instructions from the optimizer 160, the VATS test controller 102 is configured to initiate performance of a test on the initial infrastructure configuration in a virtualized environment. In this regard, the VATS test controller 102 may employ the initial infrastructure configuration as the test description discussed in the Ser. No. 12/363,558 application for patent. In addition, although the initial configuration module 164 has been described herein as identifying the initial infrastructure configuration parameters, in other embodiments, the VATS test controller 102 may identify the initial infrastructure configuration parameters without departing from a scope of the optimizer 160.

Various manners in which the VATS test controller 102 interacts with the SLiM tool 120 and the load source 130 to perform one or more tests are described in the Ser. No. 12/363,558 application for patent. That disclosure is incorporated by reference in its entirety herein. Through performance of the test on the initial infrastructure configuration of resources contained in the shared virtualized resource pool 124, as discussed in that application for patent, the VATS test controller 102 generates one or more test results 152. The test result(s) 152 may include at least one of, for instance, a number of users supported, throughputs, response times, resource utilization levels, etc., associated with the initial infrastructure configuration.

The VATS test controller 102 communicates the test result(s) 152 to the optimizer 160. More particularly, for instance, the VATS test controller 102 communicates the test result(s) 152 to the optimizer 160 through the VATS interaction module 166. In addition, the test comparison module 168 compares the test result(s) 152 with one or more predetermined requirements, which may have been defined by the workload mix 112 received from the input source 110. The predetermined requirement(s) may comprise, for instance, a throughput requirement, a response time requirement, a number of users supported requirement, etc., the workload to be performed, a resource utilization threshold requirement, a minimum resource utilization level requirement, etc. By way of particular example, the test comparison module 168 is configured to determine whether the initial infrastructure configuration is able to perform the desired workload while satisfying a predetermined throughput and response time requirement as set forth in the workload mix 112 received from the input source 110.

In a first embodiment, the test comparison module 168 is configured to output the results of the comparison to the output device 150. In this embodiment, the test comparison module 168 is configured to output an indication of whether the initial infrastructure configuration meets the predetermined requirement(s). In a second embodiment, and in the event that the test comparison module 168 determines that the test result(s) 152 meets the predetermined requirement(s), the test comparison module 168 may output the initial infrastructure configuration as a suitable configuration of an infrastructure that meets the workload mix 112, for instance, through the output module 174. In addition, in the event that the test comparison module 168 determines that one or more of the test results 152 fail to meet one or more of the predetermined requirements, the test comparison module 168 may communicate with the model application module 170 to apply a predictive model on a plurality of parameters of the initial infrastructure configuration to identify at least one parameter to modify, in which the modification of the at least one parameter is anticipated to result in the at least one test result satisfying the predetermined requirement.

The model application module 170 may receive the structural information and the resource demand information from the VATS test controller 102 and may further be configured to create the predictive model from the structural and resource demand information, as described in greater detail herein above. By way of example, the model application module 170 may identify various correlations between various infrastructure configurations and resource demands resulting from those various infrastructure configurations and may create the predictive model from those various correlations. In addition, the model application module 170 may update the predictive model to include additional correlations as the VATS test controller 102 performs additional tests on various other infrastructure configurations.

The model application module 170 is configured to determine which of the parameters of the initial infrastructure configuration, which include the number or kind of application servers employed, concurrency parameters that govern each application server's concurrency management mechanisms (e.g., threads), network bandwidth, CPU speed, cache size, memory size, etc., to modify based upon the correlations contained in the predictive model. As discussed in greater detail herein below with respect to the flow diagrams, the model application module 170 may apply the predictive model in various manners to identify the parameter(s) that are likely to result in the at least one test result of the infrastructure configuration having the parameter(s) satisfying the predetermined requirement(s).

Furthermore, the model application module 170 is configured to instruct the parameter modification module 172 to modify the initial infrastructure configuration to include the identified parameter(s). The parameter modification module 172 is configured to communicate the modified infrastructure configuration having the modified one or more parameters to the VATS test controller 102 via the VATS interaction module 166. In response, the VATS test controller 102 is configured to perform a test on the modified infrastructure configuration to identify another test result(s) 152. In addition, the another test result(s) 152 are received through the VATS interaction module 166 and communicated to the test comparison module 168, which again compares the another test result(s) 152 to the predetermined requirement(s) to determine whether the modified infrastructure configuration is associated with test result(s) 152 that satisfies the predetermined requirement(s).

In one embodiment, the VATS interaction module 166, the test comparison module 168, the model application module 170, and the parameter modification module 172 are configured to repeat the operations discussed above until the test comparison module 168 identifies a final infrastructure configuration that satisfies the predetermined requirement(s). In addition, the test comparison module 168 is configured to output the infrastructure configuration that satisfies the predetermined requirement to an output device 150 through the output module 172. In addition, the model application module 170 may update the predictive model with results of tests performed by the VATS test controller 102 to further improve the accuracy of the predictive model as additional tests are performed.

According to an example, the predetermined requirement(s) further comprises a requirement that the amount of resources utilized in performing the workload be minimized. In this embodiment, the model application module 170 is configured to identify how the parameter(s) of the infrastructure configuration are to be modified to reduce at least one resource utilization of the infrastructure configuration, while still meeting the other predetermined requirements of performing the workload and meeting the other requirements, such as, throughput, response time, etc., based upon the information contained in the predictive model.

In the embodiments discussed above, the test comparison module 168 and/or the model application module 170 are configured to output the final infrastructure configuration to the output device 150 through the output module 174. The output device 150 may comprise, for instance, a network interface, a display monitor, a printer, etc., that enables the optimizer 160 to communicate the test results 152 to one or more users.

Examples of methods of implementing the infrastructure configuration sizing system 100, and more particularly, the optimizer 160, to size an infrastructure configuration optimized for a workload mix 112, will now be described with respect to the following flow diagrams of the methods 200 and 250 depicted in FIGS. 2A & 2B, respectively. It should be apparent to those of ordinary skill in the art that the methods 200 and 250 represent generalized illustrations and that other steps may be added or existing steps may be removed, modified or rearranged without departing from the scopes of the methods 200 and 250.

The descriptions of the methods 200 and 250 are made with reference to the infrastructure configuration sizing system 100 illustrated in FIG. 1A and the optimizer 160 illustrated in FIG. 1B, and thus makes reference to the elements cited therein. It should, however, be understood that the methods 200 and 250 are not limited to the elements set forth in the infrastructure configuration sizing system 100 and the optimizer 160. Instead, it should be understood that the methods 200 and 250 may be practiced by a system having a different configuration than that set forth in the infrastructure configuration sizing system 100 and the optimizer 160.

Figure 2A:
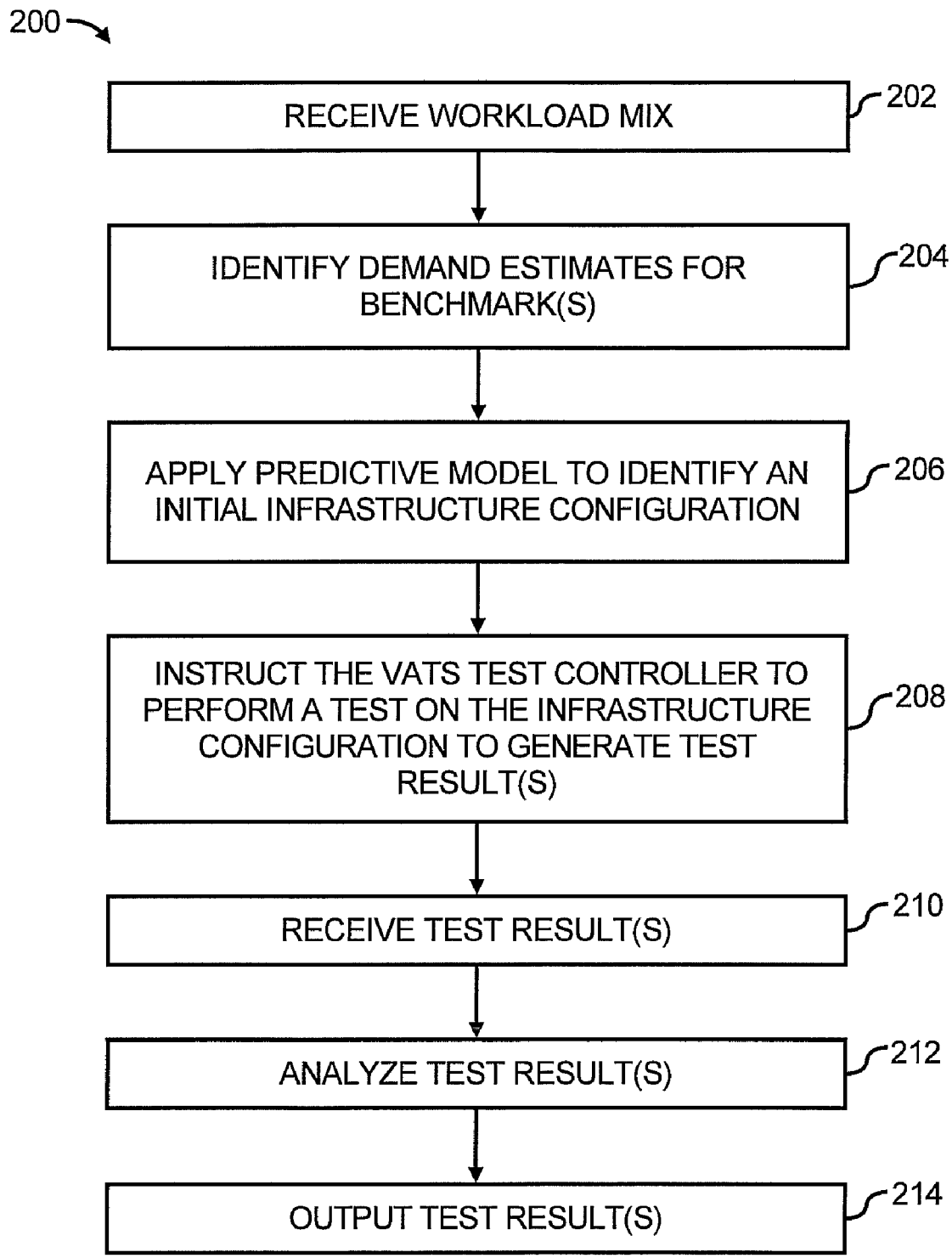
FIGS. 2A and 2B illustrate respective flow diagrams of methods of implementing the infrastructure configuration sizing system, and more particularly, the optimizer depicted in FIGS. 1A and 1B, to size an infrastructure configuration optimized for a workload mix, according to embodiments of the invention.

With reference first to FIG. 2A, at step 202, the input module 162 receives a workload mix 112 that is based upon a ratio of one or more predefined benchmark(s) from the input source 110. At step 204, the initial configuration module 164 identifies demand estimates for the predefined benchmark(s). At step 204, the initial configuration module 164 may also receive structural information pertaining to the infrastructure configuration from VATS test controller 102. At step 206, the initial configuration module 164 operates with the model application module 170 to apply a predictive model to identify an initial infrastructure configuration.

At step 208, the VATS interaction module 166 instructs the VATS test controller 102 to perform a test on the initial infrastructure configuration in the virtualized environment to generate one or more test results 152. Various manners in which the VATS test controller 102 operates to identify the test result(s) 152 are described in the Ser. No. 12/363,558 application for patent. According to a first example, the initial configuration module 164 is configured to identify the initial infrastructure configuration from the predefined benchmark information, as discussed in greater detail herein above. In a second example, the VATS test controller 102 is configured to identify the initial infrastructure configuration from the predefined benchmark information, as discussed in greater detail herein above. In the second example, the initial configuration module 164 may communicate the predefined benchmark information to the VATS test controller 102 and the VATS test controller 102 may identify resource demands from the predefined benchmark information and may identify the initial infrastructure configuration from the identified resource demands.

At step 210, the optimizer 160 receives the test result(s) 152 from the VATS test controller 102. At step 212, the test comparison module 168 analyzes the test result(s) 152 to determine whether the test result(s) 152 indicate that the initial infrastructure configuration satisfies one or more predetermined requirements. More particularly, at step 212, the test comparison module 168 determines whether the test result(s) 152 satisfies the predetermined requirement(s), for instance, as set forth in the workload mix 112 received at step 202. By way of particular example, the predetermined requirement(s) comprises a response time requirement and the test comparison module 168 determines whether the response time as identified in the test result(s) 152 satisfies the response time requirement. As another example, the predetermined requirement(s) comprises at least one of a predetermined resource utilization level threshold and a minimum resource utilization level requirement and the test comparison module 168 determines whether the resource utilization level of the initial infrastructure configuration satisfies the at least one of a predetermined resource utilization level threshold or the minimum resource utilization level requirement.

At step 214, the optimizer 160 outputs the results of the analysis performed at step 214. More particularly, the optimizer 160 outputs an indication of whether the initial infrastructure configuration satisfies the predetermined requirement(s).

According to another embodiment, the optimizer 160 outputs an indication that the initial infrastructure configuration is a suitable configuration in the event that the test result(s) 152 is determined as satisfying the predetermined requirement(s) at step 212. The second embodiment is depicted in FIG. 2B, which shows a flow diagram of a method 250 of sizing an infrastructure configuration optimized for a workload mix. As shown in FIG. 2B, the method 250 includes steps 202-212, which are identical to steps 202-212 described with respect to the method 200 shown in FIG. 2A. As such, descriptions of those steps are not repeated with respect to the method 250.

In addition to step 212, in the method 250, the test comparison module 168 determines whether the test result(s) 152 satisfies the predetermined requirement(s), at step 252. If the test result(s) 152 satisfies the test result(s) 152, the test comparison module 168 outputs this result (step 214) as an infrastructure configuration that satisfies the predetermined requirement(s) at step 254. In other words, the test comparison module 168 outputs the initial infrastructure configuration as a suitable infrastructure configuration that meets the predetermined requirement(s) at step 254.

However, if one or more of the test results 152 fail to satisfy one or more of the predetermined requirements at step 210, the test comparison module 168 communicates with the model application module 170 to apply a predictive model on a plurality of parameters of the initial infrastructure configuration to identify at least one parameter to modify, at step 256. More particularly, at step 256, the model application module 170 applies the predictive model to identify at least one of the parameters to modify, where the predictive model indicates that modification of the at least one parameter is anticipated to result in the at least one test result satisfying the predetermined requirement.

In a first example, the model application module 170 applies the predictive model by identifying at least one infrastructure configuration contained in the predictive model that is likely to result in the predetermined requirement(s) being satisfied. In this example, for instance, the model application module 170 may identify one or more infrastructure configurations that are likely to result in test result(s) 152 that meet the predetermined requirement(s) and identify which of the one or more identified infrastructure configurations is associated with the lowest utilization levels.

In a second example, the model application module 170 applies the predictive model by changing one or more parameters of the initial infrastructure configuration and predicting how that change is likely to affect the test result(s) 152. In the second example, the model application module 170 iteratively applies the predictive model until a combination of parameters that is anticipated to result in the test result(s) 152 satisfying the predetermined requirement(s) is identified. Thus, for instance, in this example, the model application module 170 identifies an infrastructure configuration that is likely to meet the predetermined requirement(s) while requiring the lowest utilization levels.

In either example, at step 256, the model application module 170 identifies a modified infrastructure configuration containing the modified parameter(s). At step 258, the model application module 170 instructs the parameter modification module 172 to create a modified infrastructure configuration that includes parameter(s) modified according to the modified arrangement identified at step 214.

At step 260, the VATS interaction module 166 communicates the modified infrastructure configuration to the VATS test controller 102 and instructs the VATS test controller 102 to perform a test on the modified infrastructure configuration, for instance as discussed in the Ser. No. 12/363,558 application for patent, to generate another test result(s) 152.

At step 262, the VATS interaction module 166 receives the another test result(s) 152 from the VATS test controller 102. In addition, the test comparison module 168 determines whether the test result(s) 152 satisfy the predetermined requirement(s) at step 252. If the test result(s) 152 satisfies the predetermined requirement(s), the test comparison module 168 outputs the modified infrastructure configuration as a suitable infrastructure configuration at step 254. In other words, the test comparison module 170 outputs the modified infrastructure configuration as a suitably sized infrastructure configuration that is optimally sized for the workload mix 112 received at step 202.

If, however, the test result(s) 152 failed to satisfy the predetermined requirement(s), the model application module 170 again applies the predictive model at step 256 to identify one or more parameters to modify from the modified infrastructure configuration. In addition, steps 252-262 may be repeated until an infrastructure configuration that satisfies the predetermined requirement(s) is identified. Thus, for instance, steps 252-262 are repeated until an infrastructure configuration that meets the predetermined requirement(s) while requiring the predetermined threshold resource utilization level requirement or the lowest utilization levels is identified. In addition, or alternatively, the method 200 may be terminated for additional reasons. For instance, the method 200 may be terminated after steps 252-262 have been repeated for a predetermined number of iterations without resulting in an infrastructure configuration that satisfies the predetermined requirement(s). In this example, the predetermined number of iterations may be based upon a predefined quantity of resources or costs have been expended or after a predefined number of iterations are performed that indicates that an infrastructure configuration that satisfies the predetermined requirement(s) is unlikely to be identified.

According to an example, the model application module 170 updates the predictive model to incorporate the test result(s) 152 received at steps 210 and 262. As such, when the model application module 170 applies the predictive model during subsequent iterations of step 256, the accuracy of the predictive model may further be increased and thus the modified infrastructure configurations created during subsequent iterations of step 258 have higher probabilities of resulting in an infrastructure configuration that satisfies the predetermined requirement(s).

Steps 252-262 may be performed for a plurality of modified infrastructure configurations in parallel or in series with respect to each other. Thus, for instance, at step 256, the model application module 170 may apply the predictive model to identifying a plurality of potential parameter modifications and the modified infrastructure configurations containing the plurality of potential parameter modifications may be tested in parallel or in series with respect to each other. In addition, the final infrastructure configuration may be outputted as indicated at step 254, in which the final infrastructure configuration comprises an infrastructure configuration that is optimally sized for the workload mix 112.

Through implementation of the methods 200 or 250, an infrastructure configuration composed of application servers, memories, network switches, bandwidth allocations, etc., configured to perform a workload configured to satisfy predefined benchmark(s) while satisfying a predetermined requirement may automatically be identified. In addition, the infrastructure configuration may be optimally sized for the workload by minimizing the resource utilization level of the infrastructure configuration, while being configured to perform the workload.

The operations set forth in the methods 200 and 250 may be contained as utilities, programs, or subprograms, in any desired computer accessible medium. In addition, the methods 200 and 250 may be embodied by computer programs, which may exist in a variety of forms both active and inactive. For example, they may exist as software program(s) comprised of program instructions in source code, object code, executable code or other formats. Any of the above may be embodied on a computer readable storage medium.

Exemplary computer readable storage medium include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 2B:
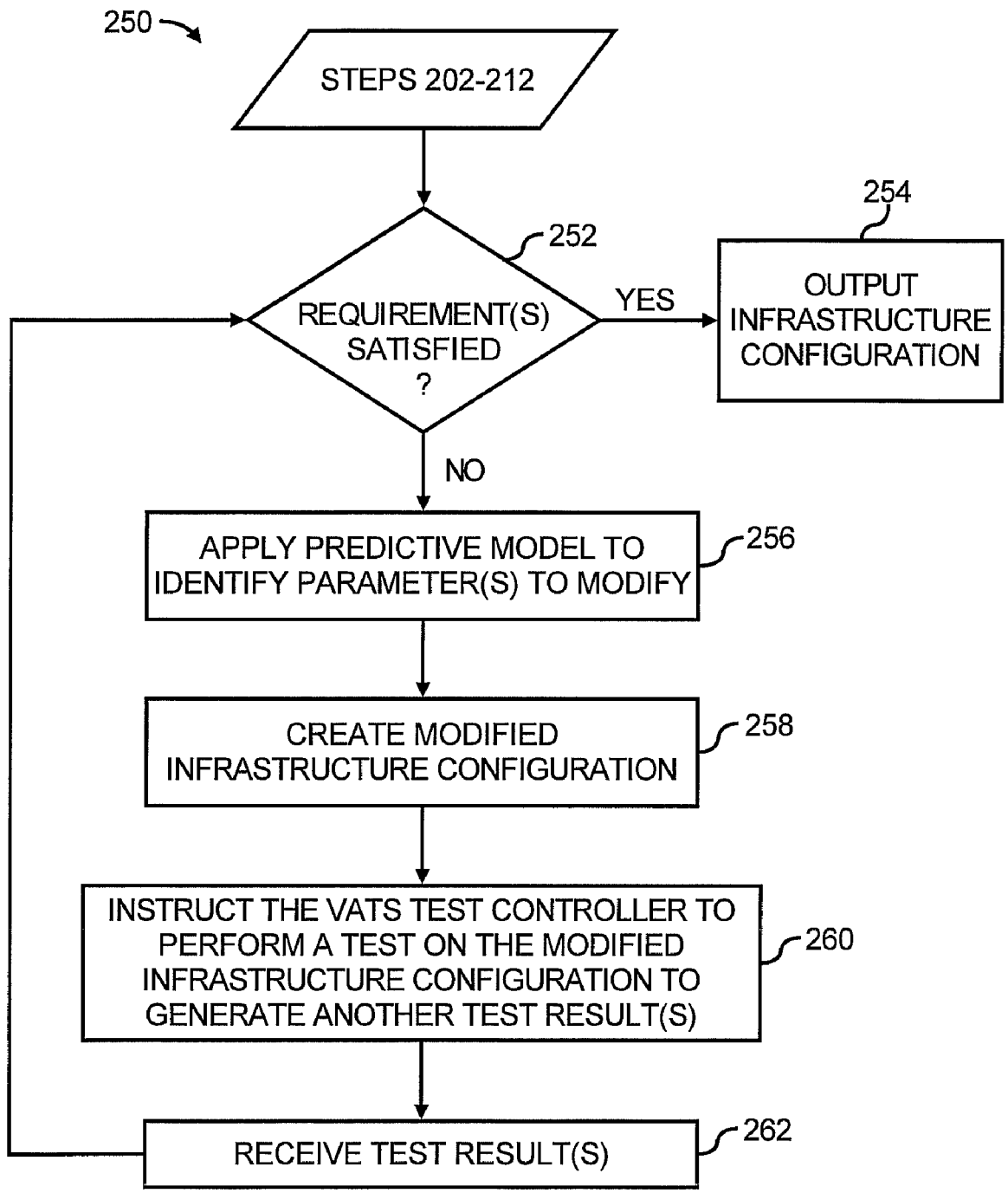
Figure 3:
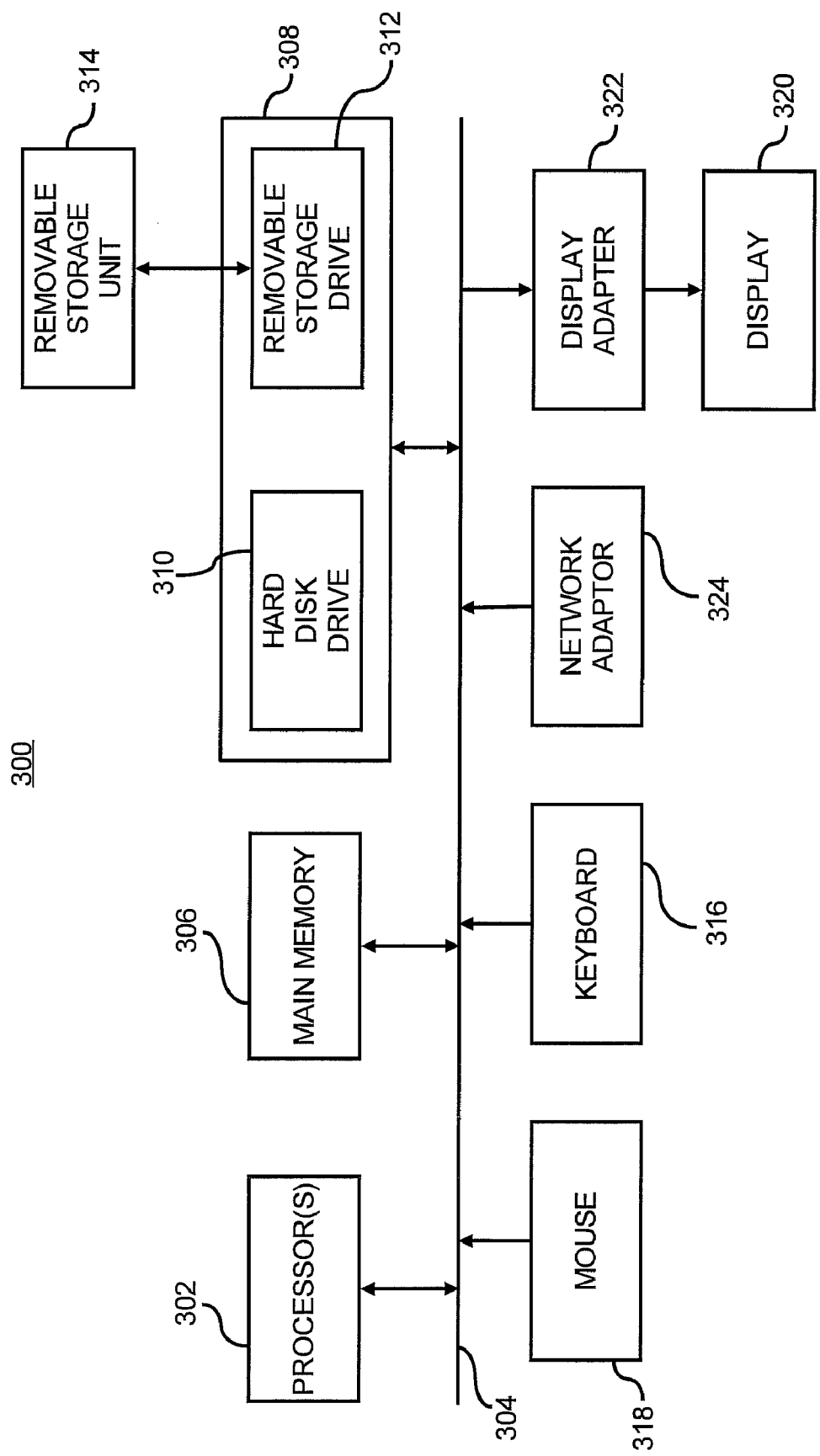
FIG. 3 illustrates a block diagram of a computing apparatus configured to implement either or both of the methods depicted in FIGS. 2A and 2B according to an embodiment of the invention.

FIG. 3 illustrates a block diagram of a computing apparatus 300 configured to implement or execute some or all of the steps defined in the methods 200 and/or 250 depicted in FIGS. 2A and 2B, according to an example. In this respect, the computing apparatus 300 may be used as a platform for executing one or more of the functions described hereinabove with respect to the optimizer 160 depicted in FIGS. 1A and 1B.

The computing apparatus 300 includes a processor 302 that may implement or execute some or all of the steps described in one or both of the methods 200 and 250. Commands and data from the processor 302 are communicated over a communication bus 304. The computing apparatus 300 also includes a main memory 306, such as a random access memory (RAM), where the program code for the processor 302, may be executed during runtime, and a secondary memory 308. The secondary memory 308 includes, for example, one or more hard disk drives 310 and/or a removable storage drive 312, representing a floppy diskette drive, a magnetic tape drive, a compact disk drive, etc., where a copy of the program code for one or both of the methods 200 and 250 may be stored.

The removable storage drive 312 reads from and/or writes to a removable storage unit 314 in a well-known manner. User input and output devices may include a keyboard 316, a mouse 318, and a display 320. A display adaptor 322 may interface with the communication bus 304 and the display 320 and may receive display data from the processor 302 and convert the display data into display commands for the display 320. In addition, the processor(s) 302 may communicate over a network, for instance, the Internet, LAN, etc., through a network adaptor 324.

It will be apparent to one of ordinary skill in the art that other known electronic components may be added or substituted in the computing apparatus 300. It should also be apparent that one or more of the components depicted in FIG. 3 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A computer-implemented method for sizing an infrastructure configuration optimized for a workload mix, said method comprising:
   (a) receiving the workload mix, wherein the workload mix is based upon a ratio of one or more predefined benchmarks;
   (b) identifying demand estimates for the one or more predefined benchmarks;
   (c) applying a predictive model to identify an initial infrastructure configuration having a size anticipated to meet the demand estimates;
   (d) instructing a virtualized-aware testing service (VATS) test controller to perform a test of the initial infrastructure configuration in a virtualized environment, wherein performance of the test generates at least one test result;
   (e) determining whether the at least one test result satisfies a predetermined requirement as identified in the workload mix; and
   (f) outputting the determination of whether the at least one test result satisfies the predetermined requirement.

2. The computer-implemented method according to claim 1, further comprising:
   receiving structural information pertaining to the infrastructure configuration from the VATS test controller; and
   wherein step (c) further comprises applying the predictive model based upon the received structural information.

3. The computer-implemented method according to claim 1, further comprising:
   creating the predictive model based upon data collected from results of a plurality of prior tests performed by the VATS test controller; and
   updating the predictive model based upon data collected from results of additional tests performed by the VATS test controller.

4. The computer-implemented method according to claim 1, further comprising:
   prior to step (f), (g) applying the predictive model on a plurality of parameters of the initial infrastructure configuration to identify at least one parameter to modify, wherein modification of the at least one parameter is anticipated to result in the at least one test result satisfying the predetermined requirement;
   repeating steps (d) and (e) on a modified infrastructure configuration containing the modified at least one parameter; and
   wherein step (f) further comprises outputting the modified infrastructure configuration as an infrastructure configuration that is optimally sized for the workload mix at step (a).

5. The computer-implemented method according to claim 4, wherein step (g) further comprises:
   (g)(1) iteratively applying the predictive model on a plurality of modified parameters until a combination of parameters that is anticipated to result in the at least one test result satisfying the predetermined requirement is identified at step (e); and
   wherein step (f further comprises outputting the infrastructure configuration having the combination of parameters that is anticipated to result in the at least one test result satisfying the predetermined requirement.

6. The computer-implemented method according to claim 4, wherein step (g) further comprises applying the predictive model on a plurality of parameters of the initial infrastructure configuration to identify a plurality of potential parameters to modify, wherein modifications of the plurality of potential parameters are anticipated to result in the at least one test result satisfying the predetermined requirement;
   following step (g), (g)(1) creating a plurality of modified infrastructure configurations, each of the plurality of modified infrastructure configurations having modifications of varying sets of parameters;
   (g)(2) instructing the VATS test controller to perform a plurality of tests in parallel with respect to each other on the plurality of modified infrastructure configurations to generate a plurality of additional test results;
   (g)(3) determining whether any of the additional test results satisfies the predetermined requirement; and
   wherein step (e) further comprises identifying the modified infrastructure configuration associated with the additional test result that satisfies the predetermined requirement and wherein step (f) further comprises outputting the modified infrastructure configuration that satisfies the predetermined requirement.

7. The computer-implemented method according to claim 6, wherein steps (g), (g)(1)-g(3) are performed in parallel for each of the plurality of modified infrastructure configurations.

8. A computer-readable storage medium on which is embedded computer code, said computer code defining an infrastructure configuration optimizer for a workload mix, said computer code comprising:
   an input module configured to receive the workload mix, wherein the workload mix is based upon a ratio of one or more predefined benchmarks;
   an initial configuration module configured to identify demand estimates for the one or more predefined benchmarks;
   a model application model configured to apply a predictive model to identify an initial infrastructure configuration having a size anticipated to meet the demand estimates;
   a virtualized-aware testing service (VATS) interaction module for interacting with a VATS test controller, wherein the VATS interaction module is configured to instruct the VATS test controller to perform a test of the initial infrastructure configuration in a virtualized environment, wherein performance of the test generates at least one test result, and wherein the VATS interaction module is configured to receive at least one test result from the VATS test controller; and a test comparison module configured to determine whether the at least one test result satisfies a predetermined requirement as identified in the workload mix.

9. The computer-readable storage medium according to claim 8, further comprising code for:

an output module configured to output results determined by the test comparison module.

10. The computer-readable storage medium according to claim 8, further comprising code for:

in response to the at least one test result failing to satisfy the predetermined requirement, the model application module to apply a predictive model on a plurality of parameters of the initial infrastructure configuration to identify at least one parameter to modify, wherein modification of the at least one parameter is anticipated to result in the at least one test result satisfying the predetermined requirement, and a parameter modification module configured to modify at least one of a plurality of parameters of the initial infrastructure configuration to create a modified infrastructure configuration as identified by the model application module, wherein the VATS interaction module is further configured to interact with the VATS test controller to cause another test to be performed on the modified infrastructure configuration to generate another at least one test result.

11. The computer-readable storage medium according to claim 10, further comprising code for the test comparison module, the model application module, the parameter modification module, and the VATS interaction module to operate until a final infrastructure configuration that causes the another at least one test result to satisfy the predetermined requirement is identified.

12. The computer-readable storage medium according to claim 10, wherein the plurality of parameters comprises at least two of a number of application servers employed, network bandwidth, CPU speed, cache size, and memory size wherein step c) further comprises modifying at least one of the network bandwidth, CPU speed, cache size, and memory size and wherein the predetermined requirement comprises at least one of a throughput requirement, a response time requirement, a number of users supported requirement, response time requirements as set forth in the workload mix, a predetermined resource utilization level threshold, and a minimum resource utilization requirement.

13. The computer-readable storage medium according to claim 8, further comprising code for:

in response to the at least one test result failing to satisfy the predetermined requirement, the model application module to apply the predictive model on a plurality of parameters of the initial infrastructure configuration to identify a plurality of potential parameters to modify, wherein modifications of the plurality of potential parameters are anticipated to result in the at least one test result satisfying the predetermined requirement; and the parameter modification module to create a plurality of modified infrastructure configurations, each of the plurality of modified infrastructure configurations having modifications of varying sets of parameters, to instruct the VATS test controller to perform a plurality of tests in parallel with respect to each other on the plurality of modified infrastructure configurations to generate a plurality of additional test results; and the test comparison module to determine whether any of the additional test results satisfies the predetermined requirement and to identify the modified infrastructure configuration associated with the additional test result that satisfies the predetermined requirement to be the final infrastructure configuration in response to the additional test result satisfying the predetermined requirement.

14. The computer-readable storage medium according to claim 8, wherein the model application module is configured to create the predictive model based upon data collected from results of a plurality of prior tests performed by the VATS test controller and to update the predictive model based upon data collected from results of additional tests performed by the VATS test controller.

15. A computer readable storage medium on which is embedded one or more computer programs, said one or more computer programs implementing a method for sizing an infrastructure configuration optimized for a workload mix, said one or more computer programs comprising a set of instructions for:

(a) receiving the workload mix, wherein the workload mix is based upon a ratio of one or more predefined benchmarks;

(b) identifying demand estimates for the one or more predefined benchmarks;

(c) applying a predictive model to identify an initial infrastructure configuration having a size anticipated to meet the demand estimates;

(d) instructing a virtualized-aware testing service (VATS) test controller to perform a test of the initial infrastructure configuration in a virtualized environment, wherein performance of the test generates at least one test result; and (e) determining whether the at least one test result satisfies a predetermined requirement as identified in the workload mix.

* * * * *

UNITED STATES PATENT AND TRADEMARK OFFICE
CERTIFICATE OF CORRECTION

PATENT NO.        : 8,055,493 B2                             Page 1 of 1
APPLICATION NO.   : 12/363597
DATED             : November 8, 2011
INVENTOR(S)       : Jerome Rolia et al.

It is certified that error appears in the above-identified patent and that said Letters Patent is hereby corrected as shown below:

In column 14, line 17, in Claim 5, delete "(f" and insert -- (f) --, therefor.

In column 14, line 45, in Claim 7, delete "(g)(1)-g(3)" and insert -- (g)(1)-(g)(3) --, therefor.

In column 15, line 40, in Claim 12, delete "c)" and insert -- (c) --, therefor.

Signed and Sealed this
Thirty-first Day of July, 2012

David J. Kappos
*Director of the United States Patent and Trademark Office*